United States Patent
Lu

(10) Patent No.: US 7,870,349 B2
(45) Date of Patent: Jan. 11, 2011

(54) METHOD FOR ACCESSING MEMORY

(75) Inventor: Ying-Chih Lu, Taipei (TW)

(73) Assignee: Inventec Corporation, Taipei (TW)

( * ) Notice: Subject to any disclaimer, the term of this patent is extended or adjusted under 35 U.S.C. 154(b) by 815 days.

(21) Appl. No.: 11/774,372

(22) Filed: Jul. 6, 2007

(65) Prior Publication Data
US 2008/0276052 A1 Nov. 6, 2008

(30) Foreign Application Priority Data
May 4, 2007 (TW) .............................. 96115831 A

(51) Int. Cl.
*G06F 12/06* (2006.01)
(52) U.S. Cl. ................. 711/154; 711/E12.082
(58) Field of Classification Search ........................ None
See application file for complete search history.

(56) References Cited
U.S. PATENT DOCUMENTS
7,130,950 B1 * 10/2006 Volentine .................... 710/260

| | | | | |
|---|---|---|---|---|
| 2005/0108494 A1* | 5/2005 | Berlin | ......................... | 711/170 |
| 2005/0110794 A1* | 5/2005 | Berlin | ......................... | 345/568 |
| 2007/0260768 A1* | 11/2007 | Bender et al. | .................. | 710/22 |
| 2008/0222338 A1* | 9/2008 | Balasubramanian et al. | | 710/306 |

* cited by examiner

*Primary Examiner*—Matt Kim
*Assistant Examiner*—Ryan Dare
(74) *Attorney, Agent, or Firm*—J.C. Patents

(57) ABSTRACT

A method for accessing a memory is provided. The method includes entering a memory accessing mode for updating a top of low memory (TOLM) value stored in a TOLM register in a chipset of a system with a highest memory address when a memory accessing command is received. The memory accessing command requests the utilization of a memory block in a memory of the system corresponding to an address space occupied by a memory-mapped input output (MMIO) function. The system then accesses the corresponding memory block in the memory according to the address space recorded in the memory accessing command. After the access is completed, the memory accessing mode is closed and the original TOLM value is written back to the TOLM register. Therefore, the present invention can access the "MMIO memory block" to prevent a waste of the memory.

9 Claims, 3 Drawing Sheets

METHOD FOR ACCESSING MEMORY

CROSS-REFERENCE TO RELATED APPLICATION

This application claims the priority benefit of Taiwan application serial no. 96115831, filed on May 4, 2007. All disclosure of the Taiwan application is incorporated herein by reference.

BACKGROUND OF THE INVENTION

1. Field of the Invention

The present invention relates to a method for accessing a memory, and more particularly to a method for accessing a memory corresponding to an address space occupied by a memory-mapped input output (MMIO) function.

2. Description of Related Art

In Intel 80×86 series microprocessors and other processor families, separate address spaces are defined to access memories and peripheral apparatuses. One of the address spaces is referred to as a memory space for accessing memory devices, whereas another address space, named input/output (I/O) space, is applied to the peripheral apparatuses. The peripheral apparatuses may also occupy the memory space, which is completely determined by hardware designers. As said design is adopted, the peripheral apparatuses are called memory-mapped devices.

In terms of the processors, the memory-mapped devices are executed as normal memories but are functioned in a completely different manner. The peripheral apparatuses not only provide data storage function but also process received information as commands or data. In the event that the peripheral apparatus is disposed in the memory space, the system is then referred to as a memory-mapped I/O (MMIO) system.

Spaces occupied by a part of input/output hardware may be saved when the memory-mapped I/O (MMIO) system is employed, for many circuits therein can be integrated together. Said arrangement is able to discard the complexity of the hardware design, even though it is not capable of reducing costs of manufacturing a whole circuit board. In addition, software technologies including pointers, data structure, and so on can be used to interact with the peripheral apparatuses, such that the relevant programs can be easily designed and efficiently executed, which is conducive to program designers.

It should be noted that each address in the memory address space corresponds to a physical memory, and the processors access the data stored in the physical memory based on the address defined in the memory address space. The MMIO function requires reserving a specific area in the memory address space for accessing the MMIO device. For example, as regards a computer using a 32-bit operating system, a certain area must be reserved in a first 4-gigabyte address space for accessing the MMIO system.

However, the certain area in the address space corresponds to the physical memory as well, and thus the memory address corresponding to the physical memory is occupied when the system performs the MMIO function, such that the corresponding part of the physical memory cannot be provided for the processor to use, leading to a waste of the memory.

Conventionally, to resolve said issue, the operating system has to support a physical address extension (PAE) mode in which the operating system is able to access the memory address space larger than or equal to four gigabytes. Next, with use of a memory remapping function of a north bridge chip, the address space having certain area occupied by the MMIO function in the memory address space is mapped onto four gigabytes or more of the address space. Given that said conditions are all satisfied, when the operating system or the application program requires utilizing the physical memory corresponding to the address space having the certain area, the processor may send a memory address larger than or equal to four gigabytes so as to access the data stored in the physical memory. However, the operating system has to support the PAE mode so as to employ said remapping function in the address space. Moreover, the north bridge chips should be equipped with the memory remapping function, and the processor has to support the function of issuing the memory address larger than or equal to four gigabytes. Unless the aforesaid three conditions are all complied with, the physical memory cannot be fully utilized. Accordingly, in most cases, the part of the physical memory is still unable to be effectively exercised, resulting in the waste of the memory.

SUMMARY OF THE INVENTION

In light of the foregoing, the present invention is directed to a method for accessing a memory. Through adjusting a top of low memory (TOLM) value of a chipset, a memory block in the memory corresponding to an address space occupied by an MMIO function can be effectively applied.

The present invention provides a method for accessing a memory. The method includes receiving a memory accessing command at first. The memory accessing command requests the access of a memory block in a memory of a system corresponding to an address space occupied by an MMIO function. Next, a TOLM value stored in a TOLM register in a chipset of the system is updated with a highest address of the memory after entering a memory accessing mode. Thereafter, the corresponding memory block in the memory can be accessed according to the address space recorded in the memory accessing command. Finally, the memory accessing mode is closed, and the original TOLM value is written back to the TOLM register.

According to an embodiment of the present invention, the step of updating the TOLM value stored in the TOLM register in the chipset of the system with the highest address of the memory includes obtaining a basic address of an I/O advanced programmable interrupt controller (IO APIC) in the chipset of the system and comparing the values of the highest address and the basic address. If the highest address is larger than or equal to the basic address, the basic address is written into the TOLM register. On the contrary, if the highest address is less than the basic address, the highest address is written into the TOLM register.

According to an embodiment of the present invention, after the step of entering the memory accessing mode for updating the TOLM value stored in the TOLM register in the chipset of the system with the highest address of the memory, the method further includes loading a program code into the memory block corresponding to the address space occupied by the MMIO function, executing the program code, and closing the memory accessing mode after the execution of the program code.

According to an embodiment of the present invention, the method further includes disabling an access function of the system for an MMIO register after the memory accessing mode is entered. Moreover, the access function of the system for the MMIO register is enabled after the memory accessing mode is closed.

According to an embodiment of the present invention, the highest address is the address space corresponding to the total storage capacity of the memory, and the highest address may be calculated according to data in relation to a physical memory, which is stored in a system management basic input output system (SMBIOS).

According to an embodiment of the present invention, the memory accessing command is issued by an operating system or an application program in the system.

According to an embodiment of the present invention, the method further includes storing the original TOLM value stored in the TOLM register of the chipset of the system after the memory accessing mode is entered.

According to an embodiment of the present invention, the chipset includes north bridge chips.

In the present invention, the TOLM value is updated with the highest address of the memory temporarily, such that the system is able to utilize the address space occupied by the MMIO function, and that the corresponding memory block can be further accessed.

In order to the make the aforementioned and other objects, features and advantages of the present invention comprehensible, several embodiments accompanied with figures are described in detail below.

DESCRIPTION OF EMBODIMENTS

Conventionally, in order to support an MMIO function, a specific area has to be reserved in an address space. However, if it is not necessary to utilize the MMIO function, the specific area in the address space can be employed by the system for accessing a corresponding physical memory. Based on the above concept, a method for accessing a memory has been developed in the present invention. In order to make the present invention more comprehensible, several embodiments are described below as examples to prove that the invention can actually be realized.

Figure 1:
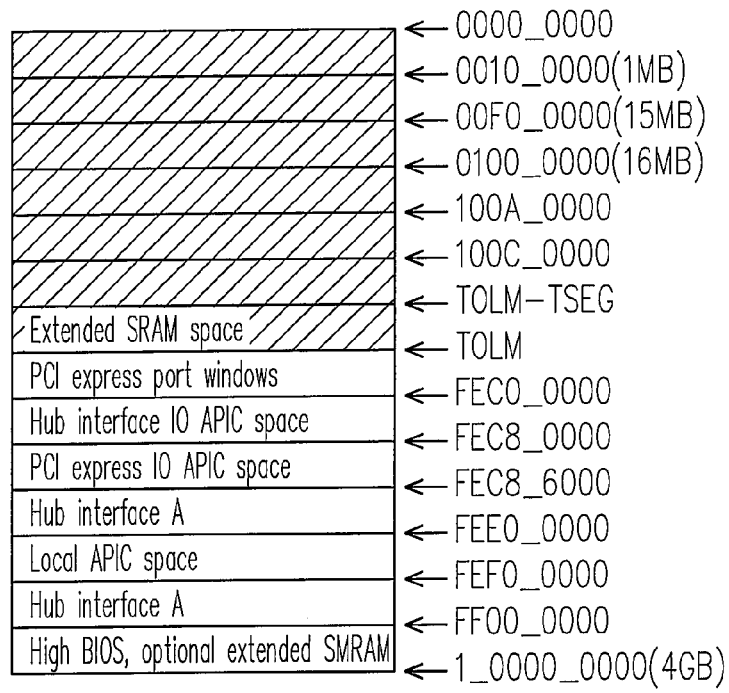
FIG. 1 depicts an arrangement of a memory address space according to an embodiment of the present invention.

FIG. 1 depicts an arrangement of a memory address space according to an embodiment of the present invention. Referring to FIG. 1, the present embodiment is adapted to a normal 32-bit system supporting an address space up to four gigabytes. With use of a TOLM register in a chipset (e.g. north bridge chips), the system is able to record a highest address (i.e. the so-called TOLM value) of a memory address space which can be used by the system. The memory address space above the TOLM value is then reserved for performing the MMIO function. In other words, the TOLM value represents the highest address by which the system can actually access the physical memory. The highest address can be calculated according to data in relation to the physical memory, which is stored in a system management basic input output system (SMBIOS).

Figure 2:
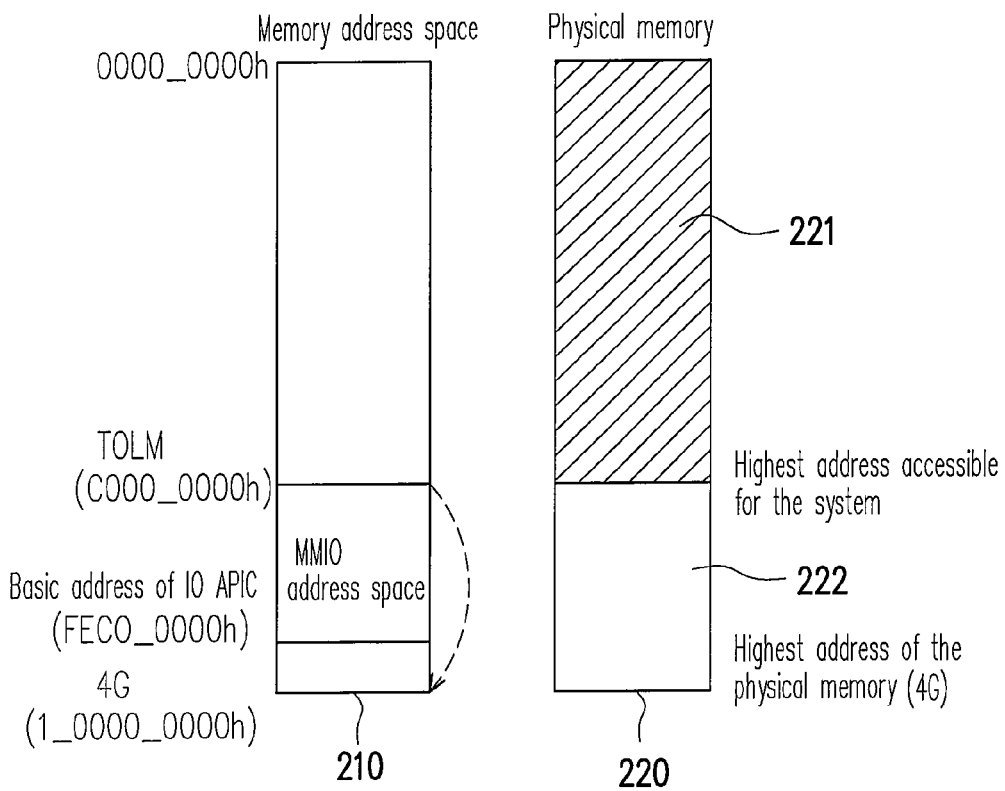
FIG. 2 depicts a corresponding correlation between a physical memory and a memory address space according to an embodiment of the present invention.

FIG. 2 depicts a corresponding correlation between a physical memory and a memory address space according to an embodiment of the present invention. With reference to FIG. 2, the corresponding correlation between a physical memory 220 and a memory address space 210 is further illustrated. Here, the TOLM value is, for example, C000_0000h, and an area between the TOLM value and a basic address (e.g. FEC0_0000h) of an I/O Advanced Programmable Interrupt Controller (IO APIC) is referred to as the address space reserved for performing the MMIO function. It is clearly shown in FIG. 2 that the area with oblique lines in the physical memory 220 indicates a memory block 221 which can be accessed by the system. The address space corresponding to a memory block 222 between the highest address of the physical memory 220 and the highest address which can be accessed by the system is occupied by the MMIO function, which accordingly brings about a waste of the memory.

To access the idling memory block 222, the TOLM value is temporarily reset as the highest address (e.g. 4 gigabytes) of the physical memory according to the present invention, and thus the occupied address space can be released for the system to access the memory block 222. An embodiment is provided hereinafter to elaborate the method for accessing the memory.

Figure 3:
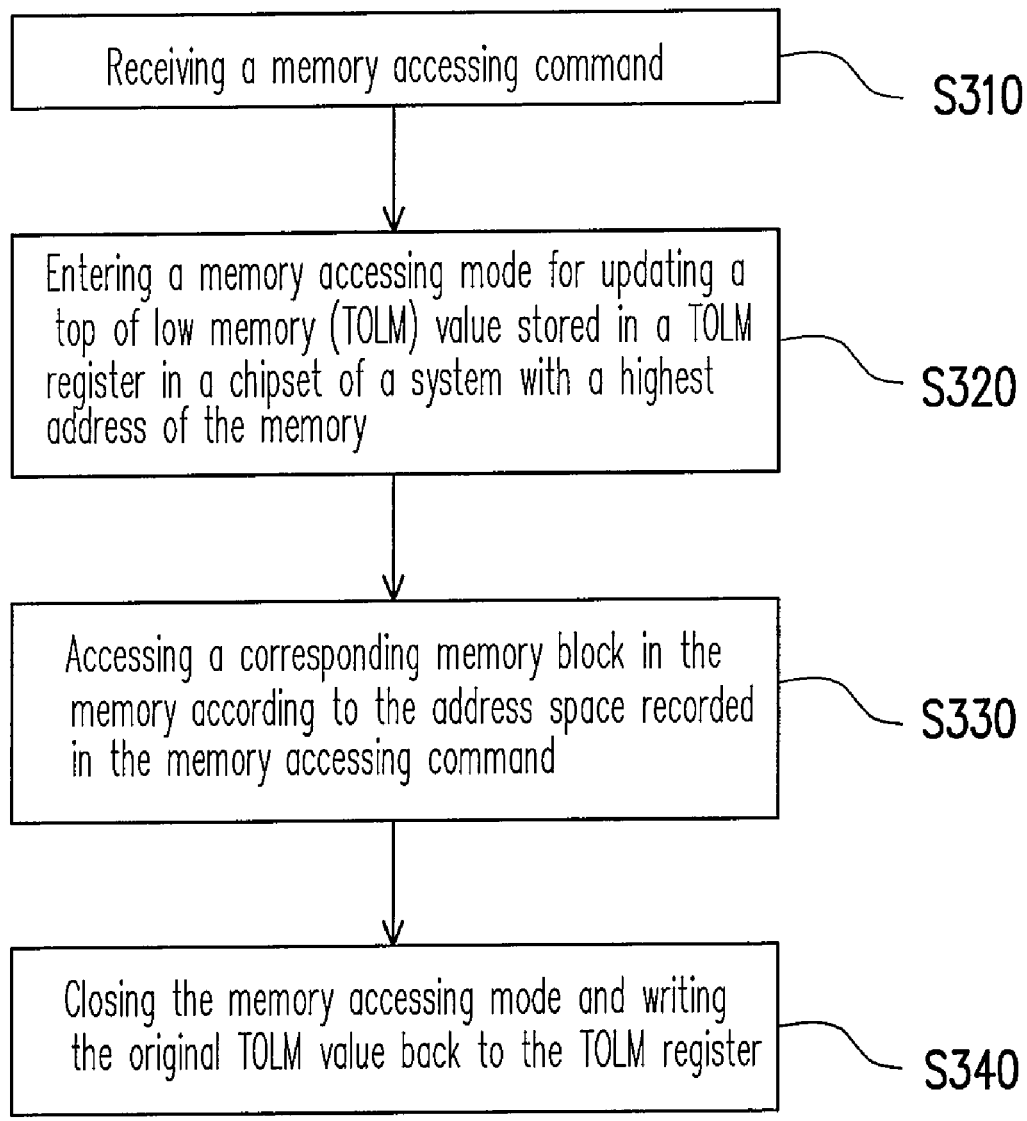
FIG. 3 is a flowchart illustrating a method for accessing a memory according to an embodiment of the present invention.

FIG. 3 is a flowchart illustrating a method for accessing a memory according to an embodiment of the present invention. Referring to FIG. 3, the present embodiment is adapted to the 32-bit system which is able to support the memory address space up to four gigabytes. The present embodiment is exemplary without imposing any limitation on the scope of the application in the present invention. People skilled in the art may, based on actual demands, apply the present invention to the systems supporting 32-bit processing or other specifications.

Due to occasional requirements for considerable memory capacity, the system may need to use the memory block (hereinafter referred to as "MMIO memory block") corresponding to the address space occupied by the MMIO function, and a memory accessing command is then issued by an operating system or an application software, so as to require a processor of the system to access the data stored in the MMIO memory block. According to the present invention, the method for accessing the memory includes entering a memory accessing mode after receiving the memory accessing command (step S310). In the memory accessing mode, the TOLM value stored in the TOLM register in the chipset of the system is updated with a highest address of the memory (step S320). The highest address is a maximum value of an address space corresponding to the total storage capacity of the memory. For example, suppose that the total storage capacity of the memory is 4 gigabytes, the maximum value of the address space which can be accessed by the system is 1_0000_0000h.

After the TOLM value is updated with the maximum value of the address space, the system can then make use of the unoccupied address space for accessing the corresponding MMIO memory block. At this time, the corresponding MMIO memory block can be accessed according to the address space recorded in the memory accessing command (step S330).

It should be noted that in addition to the normal function of accessing the memory, the method for accessing the memory as provided in the present invention further includes loading a program code into the MMIO memory block, such that the control of the processor is given to the program code for execution. Due to unlikelihood of performing the MMIO function at this time, the program code cannot directly access the MMIO register.

Finally, after the MMIO memory block is accessed or the program code loaded in the MMIO memory block is executed, the memory accessing mode is closed and the original TOLM value is written back to the TOLM register (step S340). Here, the TOLM value is a default value originally stored in the TOLM register before the system enters the memory accessing mode. After entering the memory accessing mode, the system stores the original TOLM value, such that a default state thereof can be restored later.

According the present invention, it should be noted that a larger memory block can be used after the TOLM value is updated. However, it is unlikely to perform the MMIO function. Thus, after entering the memory accessing mode, the method for accessing the memory as disclosed in the present invention further includes disabling an access function of the system for the MMIO register. Namely, possible errors occurring in the system can be avoided through prohibiting the operating system or the application program from accessing the MMIO register. By contrast, after the memory accessing mode is closed, the access function of the system for the MMIO register is enabled, such that the system can again perform the MMIO function.

Based on the above, in the present embodiment of the present invention, the TOLM value is updated with the maximum value of the memory address space, whereas a basic address of the IO APIC is also taken into consideration in another embodiment provided hereinafter for better elaboration.

Figure 4:
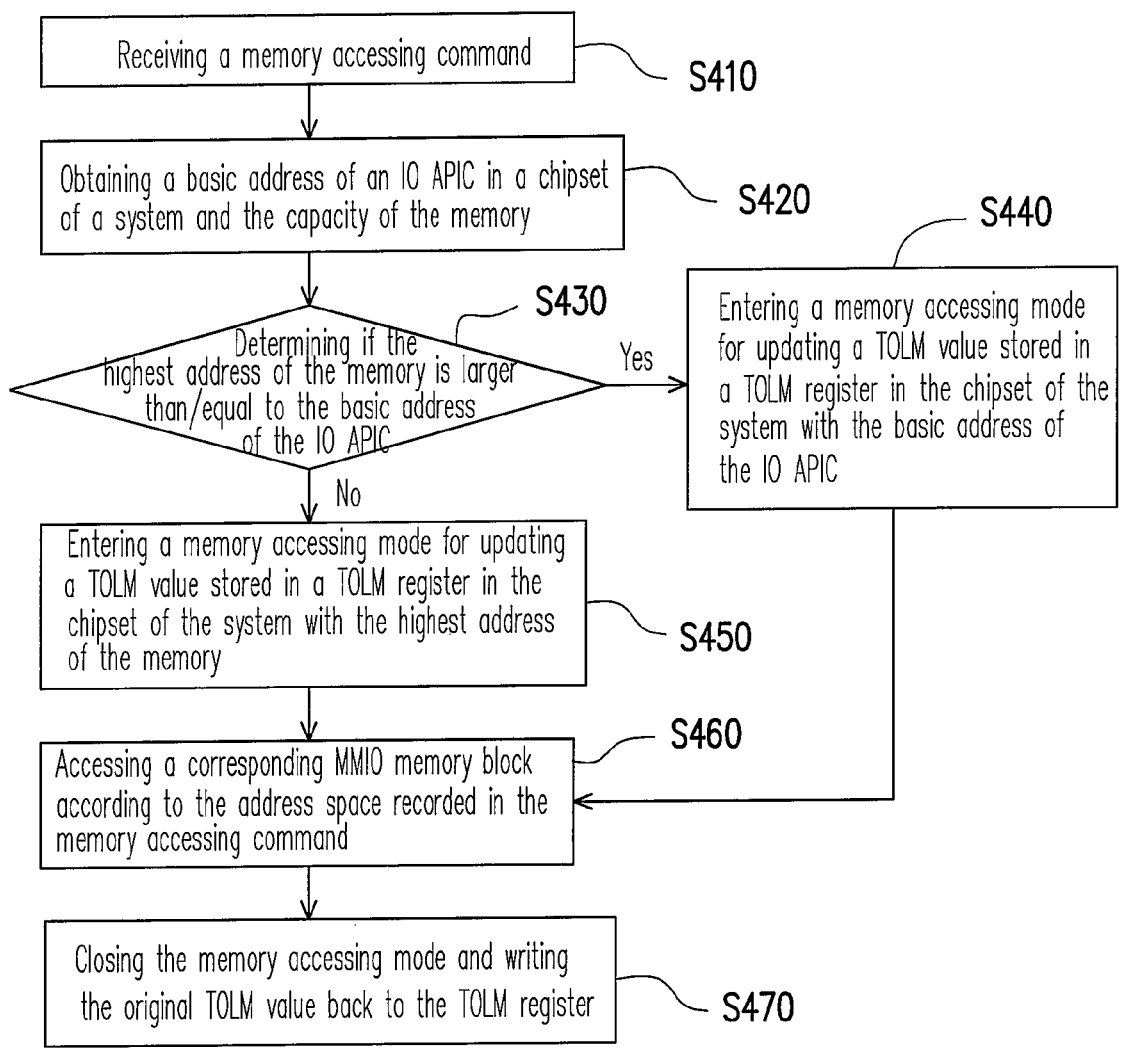
FIG. 4 is a flowchart illustrating a method for accessing a memory according to another embodiment of the present invention.

FIG. 4 is a flowchart illustrating a method for accessing a memory according to another embodiment of the present invention. Please refer to FIG. 4. An area of the memory address space corresponding to the IO APIC originally follows the address space occupied by the MMIO function and usually stores important I/O data.

Accordingly, it is preferable to prevent the use of the data stored in the area of the address space of the IO APIC when the physical memory is accessed. For example, the area of the address space is in a range from the basic address of the IO APIC to the highest address of the memory. As shown in FIG. 2, the area of the address space is in a range from FEC0_0000h to 1_0000_0000h.

Accordingly, the method for accessing the memory provided in the present invention includes obtaining the values of the basic address of the IO APIC and the highest address of the memory, so as to determine whether the TOLM value should be updated with the basic address or the highest address. The method includes the following steps.

In the present embodiment, the memory accessing mode is entered after the system receives the memory accessing command (step S410), which is similar to the previous embodiment. Here, the basic address of the IO APIC in the chipset of the system is firstly obtained by the system, and the capacity of the memory is acquired as well (step S420).

Next, the basic address of the IO APIC and the highest address of the memory are compared. For example, whether the highest address of the memory is larger than, equal to or less than the basic address of the IO APIC is determined (step S430). If the highest address is larger than or equal to the basic address of the IO APIC, the basic address is written into the TOLM register. In other words, the TOLM value is updated with the basic address of the IO APIC (step S440), such that the system is prevented from using the memory corresponding to the IO APIC. On the contrary, if the highest address of the memory is less than the basic address of the IO APIC, the highest address is written into the TOLM register (step S450) as described hereinbefore.

After the TOLM value is updated, the system can then make use of the unoccupied address space for accessing the corresponding MMIO memory block. Here, the corresponding MMIO memory block can be accessed according to the address space recorded in the memory accessing command, or the program code can be loaded into the MMIO memory block for execution (step S460).

Finally, the MMIO memory block is then accessed. In the alternative, after the MMIO memory block is completely accessed, or the program code loaded into the MMIO memory block is fully executed, the memory accessing mode is closed and the original TOLM value is written back to the TOLM register (step S470). Thereby, the system can be restored to the default state.

In conclusion of above descriptions, the method for accessing the memory disclosed in the present invention at least has the following advantages:

1. Since the TOLM value is updated with the higher memory address space, the operating system is able to utilize the NMIO memory without supporting or entering the PAE mode, excluding possible incompatibility between the operating system and the memory.

2. In the method, it is not necessary to perform the memory remapping function. Correspondingly, it is not an issue whether the remapping function is supported by the chipset or not in the method. Thus, the operating procedures required by the chipset can be simplified, and the costs may also be reduced.

3. In terms of the 32-bit system, the MMIO memory can be accessed in the absence of utilizing the memory address space exceeding 4 gigabytes. Therefore, the processor of the system is not required to issue a command with the address space larger than four gigabytes.

Although the present invention has been disclosed above by the embodiments, they are not intended to limit the present invention. Anybody skilled in the art can make some modifications and alteration without departing from the spirit and scope of the present invention. Therefore, the protecting range of the present invention falls in the appended claims.

What is claimed is:

1. A method for accessing a memory, comprising:
receiving a memory accessing command, wherein the memory accessing command requests for accessing a memory block in a memory of a system corresponding to an address space occupied by a memory-mapped input output (MMIO) function;
entering a memory accessing mode for updating a top of low memory (TOLM) value stored in a TOLM register in a chipset of the system with a highest address of the memory, comprising
obtaining a basic address of an I/O advanced programmable interrupt controller (IO APIC) in the chipset of the system;
comparing the highest address and the basic address;
writing the basic address into the TOLM register when the highest address is larger than or equal to the basic address; and
writing the highest address into the TOLM register when the highest address is less than the basic address;
accessing the corresponding memory block in the memory according to the address space recorded in the memory accessing command; and
closing the memory accessing mode and writing the original TOLM value back to the TOLM register.

2. The method for accessing the memory as claimed in claim 1, wherein after the step of entering the memory accessing mode for updating the TOLM value stored in the TOLM register in the chipset of the system with the highest address of the memory, the method further comprises:

loading a program code into the memory block corresponding to the address space occupied by the MMIO function; and executing the program code and closing the memory accessing mode after the execution of the program code.

3. The method for accessing the memory as claimed in claim 1, further comprising disabling an access function of the system for an MMIO register after entering the memory accessing mode.

4. The method for accessing the memory as claimed in claim 3, further comprising enabling the access function of the system for the MMIO register after closing the memory accessing mode.

5. The method for accessing the memory as claimed in claim 1, wherein the highest address is the address space corresponding to the total storage capacity of the memory.

6. The method for accessing the memory as claimed in claim 1, wherein the highest address is calculated according to data in relation to the memory, which is stored in a system management basic input output system (SMBIOS).

7. The method for accessing the memory as claimed in claim 1, wherein the memory accessing command is issued by an operating system or an application program in the system.

8. The method for accessing the memory as claimed in claim 1, wherein after entering the memory accessing mode, the method further comprises:

storing the original TOLM value stored in the TOLM register of the chipset of the system.

9. The method for accessing the memory as claimed in claim 1, wherein the chipset comprises north bridge chips.

* * * * *